3,494,927
3-LOWERALKYLTHIO IMIDAZOPYRIDINES
Albert J. Frey, Essex Fells, and Robert E. Manning, Mountain Lakes, N.J., assignors to Sandoz Inc., Hanover, N.J.
No Drawing. Filed Oct. 5, 1967, Ser. No. 673,004
Int. Cl. C07d 57/04, 49/36; A61k 27/00
U.S. Cl. 260—293.4                                    2 Claims

ABSTRACT OF THE DISCLOSURE

This disclosure relates to novel 3-loweralkylthio imidazopyridines. These compounds are useful as anorectics.

---

This invention relates to novel heterocyclic compounds and more particularly to novel 3-loweralkylthio imidazopyridines. Still more particularly, this invention pertains to 1 - p - chlorophenyl - 3 - loweralkylthio imidazo[1,5-a] pyridines and to their methods of preparation.

The compounds of this invention may be represented by the formula:

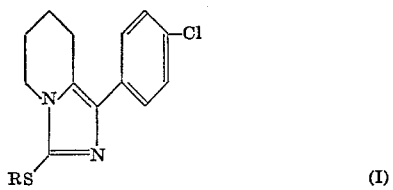

where:
R is lower alkyl, i.e., an alkyl radical having 1 to 5 carbon atoms such as methyl, ethyl, isopropyl and the like.

The compounds represented by Formula I above are prepared by treatment of 3 - thioxoimidazo[1,5-a]pyridines with a lower alkyl halide such as methyl iodide, ethyl bromide, methyl chloride and the like. The process may be illustrated by the following flow diagram:

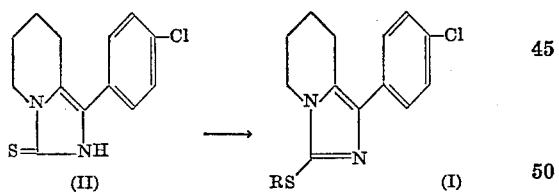

where R is as indicated above.

The loweralkylthio imidazopyridines of Formula I are prepared by treating 1 - p - chlorophenyl - 3 - thioxo-2,3,5,6,7,8 - hexahydroimidazo[1,5-a]pyridine (II) with a loweralkyl halide, e.g., methyl iodide in a solvent at temperatures generally from about room temperature to reflux temperature. The solvent utilized may be a lower alkanol, for example, methanol, ethanol and the like, ethers, chlorinated hydrocarbons, tetrahydrofuran, aromatic hydrocarbons, e.g., benzene, and the like. Although neither the temperature nor the solvent used is critical in obtaining the desired product (I), the reaction temperature is preferably about 20° to 100° C., and still more particularly about 40° to 80° C. The product may be recovered by conventional techniques such as extraction, crystallization, and the like.

The 3-thioxo imidazopyridine (II) represented hereinabove may be prepared from p - chlorophenyl - 2 - piperidyl ketone, a known compound prepared as described in the literature, by treatment with sodium thiocyanate.

The pyridines represented by Formula I above are useful because they possess pharmacological properties in animals. In particular, these compounds are useful as anorectic agents, as indicated by their activity in rats tested using the free-feeding method described by Randall et al. [J.P.E.T. 129, 163 (1960)]. When so utilized, the compounds may be combined with one or more pharmaceutically acceptable carriers or adjuvants. They may be administered orally or parenterally and, depending upon the compound employed and the mode of administration, the exact dosage utilized may vary. Furthermore, the compounds may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzene-sulfonate and the like. In general, satisfactory results are obtained when these compounds are administered at a daily dosage of about 1 milligram to about 50 milligrams per kilogram of animal body weight. This daily dosage is preferably administered 2 to 4 times a day, or in sustained release form. For most large mammals, the total daily dosage is about 150 milligrams. Dosage forms suitable for internal use comprise from about 35 milligrams to about 80 milligrams of the active compound in intimate admixture with a solid or liquid pharmaceutically acceptable carrier or diluent.

A representative formulation suitable for oral administration is a tablet prepared by standard tabletting techniques which contains the following:

| Ingredient: | Parts by wt. |
|---|---|
| 1 - p - chlorophenyl - 3 - thiomethyl - 5,6,7,8-tetrahydroimidazo[1,5-a]pyridine | 30 |
| Tragacanth | 2 |
| Lactose | 59.5 |
| Corn starch | 5 |
| Talcum | 3 |
| Magnesium stearate | 0.5 |

The following examples are provided for the purpose of illustration and not by way of limitation.

EXAMPLE 1

1-p-chlorophenyl-3-thiomethyl-5,6,7,8-tetrahydroimidazo[1,5-a]pyridine

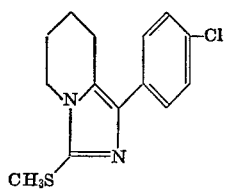

A mixture of 1-p-chlorophenyl-3-thioxo-2,3,5,6,7,8-hexahydroimidazo[1,5-a]pyridine (5.0 g.), methyliodide (5.0 g.) and ethanol (75 ml. is refluxed for 1½ hours. The solution is concentrated in vacuo and the resultant crystals are collected to give 7 g. hydroiodide salt. The salt is dissolved in water, made basic with sodium carbonate solution and extracted with ether. The ether is dried using sodium sulfate and evaporated. Crystallization of the residue from methanol-water (4:1) gives 4 g. of 1 - p-chlorophenyl-3-thiomethyl-5,6,7,8-tetrahydromidazo [1,5-a]pyridine, M.P. 111–113°.

EXAMPLE 2

1-p-chlorophenyl-3-thioxo-2,3,5,6,7,8-hexahydro-imidazo[1,5-a]pyridine

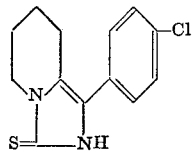

A solution of sodium thiocyanate (8.0 g.) in water (50 ml.) is added dropwise over 5 minutes to a stirred solution of p-chlorophenyl-2-piperidyl ketone (11 g.) in glacial acetic acid (50 ml.) and water (200 ml.). The reaction mixture is stirred for 20 minutes and the resultant solid is collected by filtration to give 17 g. solid which is refluxed in 190 ml. glacial acetic acid for 3 hours. After cooling, the crystals are collected to give 10.4 g. of crude product; M.P. 293°. Recrystallization from dimethylformamide-methanol (1:3) gives 1-p-chlorophenyl-3-thioxo-2,3,5,6,7,8-hexahydro-imidazo[1,5-a]pyridine; M.P. 300° to 302° C.

What is claimed is:
1. An imidazopyridine having the formula:

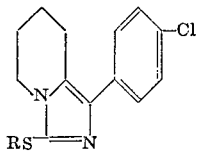

where:
R is lower alkyl, or non-toxic pharmaceutically acceptable acid addition salts thereof.

2. A compound according to claim 1 which is 1-p-chloro-phenyl-3-thiomethyl - 5,6,7,8 - tetrahydroimidazo [1,5-a]pyridine.

References Cited

UNITED STATES PATENTS

| | | | |
|---|---|---|---|
| 1,915,334 | 6/1933 | Salzberg et al. | 260—243 |
| 2,075,359 | 3/1937 | Salzberg et al. | 167—22 |

HENRY R. JILES, Primary Examiner

S. D. WINTERS, Assistant Examiner

U.S. Cl. X.R.

260—294.7; 424—267